UNITED STATES PATENT OFFICE.

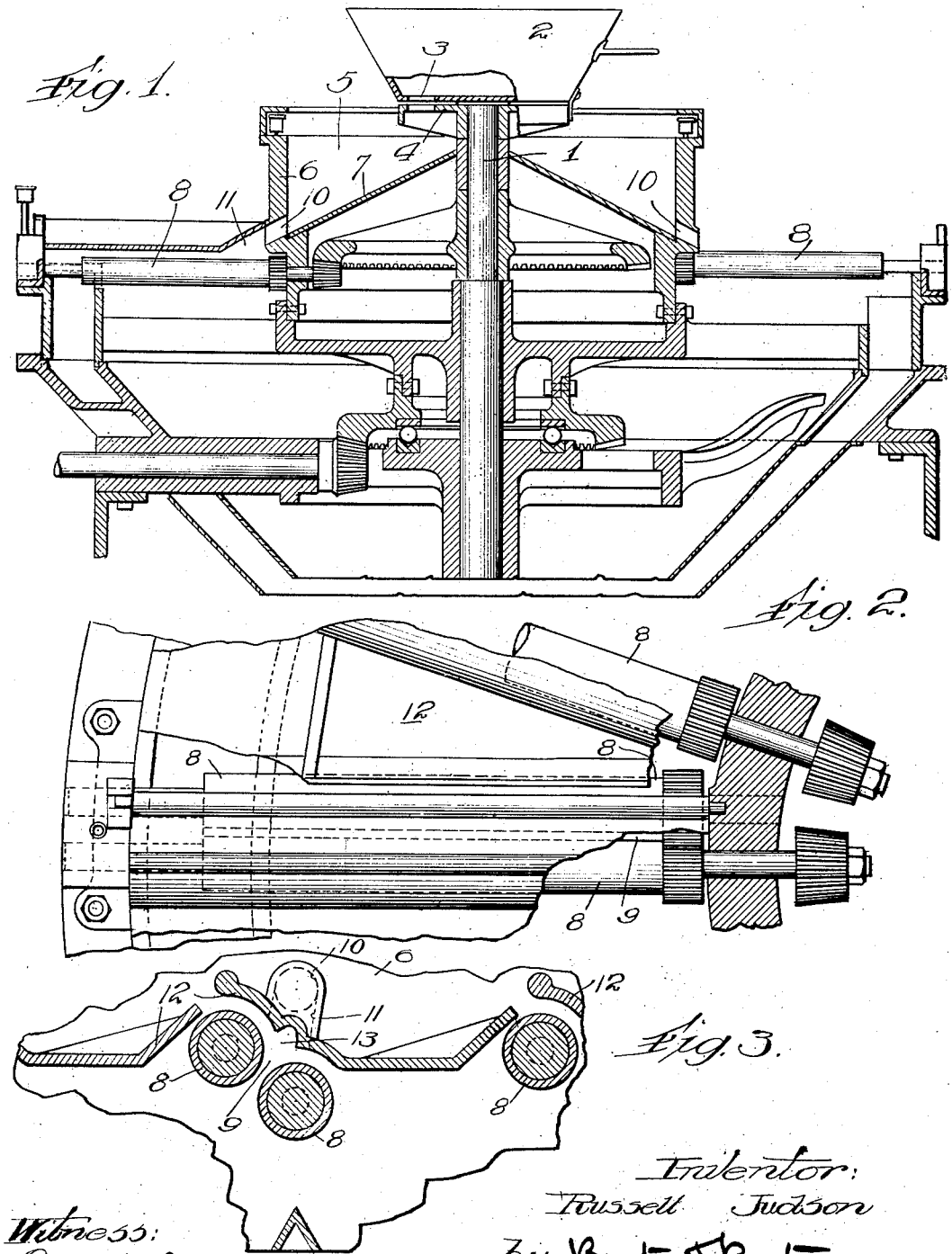

RUSSELL JUDSON, OF DURAND, MICHIGAN.

BEAN-PICKING MACHINE.

1,366,665.  Specification of Letters Patent.  Patented Jan. 25, 1921.

Application filed March 26, 1917. Serial No. 157,338.

*To all whom it may concern:*

Be it known that I, RUSSELL JUDSON, a citizen of the United States, residing at Durand, in the county of Shawassee and the State of Michigan, have invented certain new and useful Improvements in Bean-Picking Machines, of which the following is a specification, reference being had to the accompanying drawings, forming a part thereof.

This invention relates to a bean picking machine of a type comprising several pairs of picking or sorting rolls, mounted for bodily revolution about a fixed vertical axis and fed with beans from a distributing hopper arranged adjacent to such axis. The present invention is particularly concerned with the containing and guiding means which constitute the passageway for the beans from the distributing hopper to the rolls, and it consists in the features and elements as hereinafter described as shown in the drawings and as indicated by the claims.

In the drawings:—

Figure 1 is a vertical sectional view of a machine embodying this invention.

Fig. 2 is a fragmentary plan view partly in section, showing a pair of the rolls and associated parts.

Fig. 3 is a detail vertical section taken transversely of a pair of rolls to indicate the relation of the cover plates thereto.

In the construction shown, the fixed central post, 1, carries a stationary receiving hopper, 2, having perforations, 3, in its bottom, which may be opened or closed by rotative adjustment of the hopper with respect to a gate, or valve member, 4, to permit discharge of the contents by gravity. Disposed directly below the discharge openings, 3, of the hopper, 2, is a distributing hopper, 5, comprising a cylindrical side-wall vertically disposed at 6, and a conical bottom, 7, sloping downwardly from the post, 1 to its junction with the lateral wall, 6. The wall, 6, is positioned just inside of the inner ends of the picking rolls, 8, each pair of which forms a trough at 9, along which the smooth and comparatively round beans will be carried by centrifugal force when the rolls, 8, are revolving bodily around the post, 1, while the rougher, or misshapen beans, will be passed through the rolls by friction in a manner well understood.

To permit the discharge of the beans from the distributing hopper, 5, to the trough, 9, the lateral wall, 6, is provided with discharge ports, 10, each of which registers with one of the troughs, 9, and the entire hopper, 5, is mounted to revolve about the post, 1, in unison with the several sets of picking rolls, 8. Thus the beans discharged by gravity from the receiving hopper, 2, will fall directly upon the inclined conical bottom, 7, and will be carried outwardly across said bottom, both by gravity and centrifugal force generated by the revolution of the hopper. Arriving at the lateral wall, 6, the beans will accumulate against it, while those happening to arrive opposite the ports, 10, will pass therethrough immediately into the trough, 9, to be sorted as intended by the picking rolls, 8.

The rotation of the hopper, 5, combined with the agitation of the beans therein, produced by the constant gravity flow of more material from the receiving hopper, 2, will serve to shift the beans accumulated against the wall, 6, of the hopper, 5, sufficiently to provide a perfectly continuous feed through the ports, 10. And, since the passageways formed by the ports, 10, are very short and considerably larger in diameter than the beans which they are designed to accommodate, there is little opportunity for them to become clogged, because any wedging of the beans at the inner side of the port is almost certain to be broken up by the agitation of the beans immediately in contact with them and within the hopper, 5. The passageways formed by the ports, 10, are parallel-sided and without any taper, and discharge immediately into a space at 11, under the cover plates 12, which space, 11, is of considerably greater cross-section than the ports, 10, themselves. The capacity of the space, 11, is therefore even greater than that of the ports, 10, furthermore, it is directly over the trough, 9, formed by the rolls, 8, so that, upon arriving here, the beans are taken immediately into the control of the rolls themselves and the farther out they travel in radial direction along the trough, 9, the greater becomes the centrifugal force tending to propel them outwardly, and hence the less becomes the tendency for clogging or wedging and the greater becomes the capacity of a passageway of any given cross-section, as, for example, the passageway, 13, formed by the cover plates, 12, and the trough, 9.

In the event that any clogging should occur at any of the ports, 10, the fact may be observed immediately by the operator, because the hopper, 6, is upwardly open and is considerably larger in diameter than the receiving hopper, 2, thus leaving a clear annular space through which the operator can observe the action in the hopper and in which he may readily reach his hand or a convenient tool for breaking up any stoppage at these points. Thus the construction described both reduces to a minimum the possibility of clogging of the passageway and provides a maximum of accessibility for such passageway, by virtue of which any stoppage may be readily relieved.

I claim:

1. In a grain sorting machine comprising picking mechanism mounted to revolve about a vertical axis, a distributer revolving therewith and having a bottom wall inclined downwardly and outwardly from said axis for conveying the grain to the picking mechanism, and a peripheral wall with ports leading to said mechanism, said distributer being upwardly open in the vicinity of such wall to afford easy observation of the feed at the ports and ready access thereto, as well as avoiding choking the flow of grain over the bottom of the distributer.

2. In a grain sorting machine comprising picking mechanism mounted to revolve about a vertical axis, a distributer revolving therewith and having a bottom wall inclined downwardly and outwardly from said axis for conveying the grain to the picking mechanism, and a peripheral wall with ports leading to said mechanism, the length of such ports being limited substantially to the thickness of the peripheral wall of the distributer.

3. In a grain sorting machine comprising picking mechanism mounted to revolve about a vertical axis, a distributer revolving therewith and having a bottom wall inclined downwardly and outwardly from said axis for conveying the grain to the picking mechanism, and a peripheral wall with ports leading to said mechanism, the area of the inclined bottom in the vicinity of said peripheral wall being unobstructed to permit travel of the grain in circumferential direction adjacent said wall for access to any convenient port therein.

4. In a grain-sorting machine comprising picking mechanism mounted to revolve about a vertical axis, a distributer revolving therewith comprising a conical bottom inclined downwardly and outwardly from said axis and a peripheral wall to which said bottom wall extends, said peripheral wall having ports leading to said picking mechanism and the surface of the bottom wall and the peripheral wall being unobstructed adjacent said ports to permit circumferential distribution of the grain to said ports.

In testimony whereof I have hereunto set my hand at Durand, Mich., this 21st day of March, 1917.

RUSSELL JUDSON.